United States Patent
Yoda

(10) Patent No.: US 7,188,337 B2
(45) Date of Patent: Mar. 6, 2007

(54) INTERRUPT PROGRAM MODULE

(75) Inventor: Kiwamu Yoda, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 502 days.

(21) Appl. No.: 10/654,442

(22) Filed: Sep. 4, 2003

(65) Prior Publication Data

US 2004/0143779 A1  Jul. 22, 2004

(30) Foreign Application Priority Data

Sep. 4, 2002  (JP)  ............................. 2002-258994

(51) Int. Cl.
  *G06F 9/44*   (2006.01)
  *G06F 15/00*  (2006.01)
  *G06F 11/00*  (2006.01)
  *G06F 9/45*   (2006.01)

(52) U.S. Cl. ...................... 717/127; 717/150; 717/160; 712/233; 712/244; 714/48

(58) Field of Classification Search ........ 717/127–131, 717/139, 150, 160; 710/260–262, 266; 714/38, 714/48; 712/214, 233, 234, 244
See application file for complete search history.

(56) References Cited

U.S. PATENT DOCUMENTS

| | | | | |
|---|---|---|---|---|
| 4,410,938 | A * | 10/1983 | Higashiyama | 714/47 |
| 5,459,872 | A * | 10/1995 | Connell et al. | 710/263 |
| 5,488,716 | A * | 1/1996 | Schneider et al. | 714/10 |
| 5,530,872 | A * | 6/1996 | Smeltzer et al. | 710/260 |
| 5,727,227 | A * | 3/1998 | Schmidt et al. | 712/36 |
| 5,797,019 | A * | 8/1998 | Levine et al. | 710/262 |
| 5,944,816 | A * | 8/1999 | Dutton et al. | 712/215 |
| 5,983,018 | A * | 11/1999 | Kanzaki | 717/127 |
| 6,192,425 | B1 * | 2/2001 | Sato | 710/48 |
| 6,338,111 | B1 * | 1/2002 | Stevens | 710/260 |
| 6,564,339 | B1 * | 5/2003 | Swoboda et al. | 714/30 |
| 6,820,155 | B1 * | 11/2004 | Ito | 710/262 |

OTHER PUBLICATIONS

TITLE: Interrupt Processing in Concurrent Processors, author: Walker et al, IEEE, 1995.*
TITLE: Instruction issue logic for high-performance, interruptable pipelined processors, author: Sohi et al, ACM, 1987.*
TITLE: Implementation of precise interrupts in pipelined processors, author: Smith, IEEE, 1985.*

* cited by examiner

Primary Examiner—Antony Nguyen-Ba
(74) Attorney, Agent, or Firm—Wenderoth, Lind & Ponack, L.L.P.

(57) ABSTRACT

A computer implemented method to be implemented by a computer, which sequentially consecutively performs a plurality of predetermined process, when the computer receives an interrupt request to supply monitoring information which represents the processing state of the computer. The computer implemented method determines whether or not to execute an interrupt process, in which the monitoring information is supplied to the monitoring unit based on the information received when the computer receives the interrupt request. The interrupt program module further supplies the monitoring information which corresponds to the computer process which occurred immediately before deciding to execute an interrupt process. The interrupt program module also cancels an interrupt process after the monitoring information is sent to the monitoring unit.

11 Claims, 4 Drawing Sheets

INTERRUPT PROGRAM MODULE

BACKGROUND OF THE INVENTION

The invention relates to a computer such as an MCU (Micro Controller Unit) which can be built into various types of electronic equipment, and particularly relates to an interrupt program module for performing a monitoring function for the computer.

MCU, Among MCUs which are typically used as so-called one-chip microcomputers, there is a type of MCU which includes an on-chip debugging function for implementing a process of debugging the program residing on the chip. According to the on-chip debugging function, the internal state of the MCU can be monitored from an external device without using an expensive emulator, thereby analyzing a program fault.

When utilizing such a monitoring function, the MCU can be connected to an external monitoring unit so as to communicate via a communication mechanism such as a conventionally well known UART (Universal Asynchronous Receiver/Transmitter). When the monitoring function is performed, information read from a memory device such as a RAM (Random Access Memory), a ROM (Read Only Memory), or an SFR (Special Function Register) residing in the MCU are appropriately supplied to and analyzed by the monitoring unit.

Meanwhile, the program of the MCU set forth above is generally provided with a plurality of processing loops each constituting a loop, wherein each processing loop is selectively implemented via a branch decision step. Each processing loop is provided with one or plural program modules for implementing one or plural processing steps capable of executing a series of processes. When the processing steps terminate, a program returns to the branch decision step by an instruction of the loop. It is possible to monitor the state of each desired processing loop to be implemented immediately before returning to the branch decision by inserting the program module for such a monitoring function into processing loops to be parallel therewith, namely, by selectively inserting the program module as a decision branch in the branch decision step.

However, according to the conventional program, since the processing loop or other loops for monitoring function can be selectively implemented via the branch, for example, even if it is intended to investigate the state of processing loops comprising a plurality of processing steps before or after each step is implemented, it is impossible to move to the monitoring function during the implementation of the processing loops.

Further, in cases where the program module falls into an uncontrolled state which stops the proceeding of the loop during the execution of the processing loop, it is impossible to perform the monitoring function because the return to the branch decision step is prevented.

SUMMARY OF THE INVENTION

An object of the present invention is to provide an interrupt program module capable of investigating the state of processing of an MCU before or after a desired step among a plurality of processing steps which constitute processing loops implemented by the MCU.

The invention is developed based on the basic concept that the monitoring function set forth above is inserted into each processing loop as an interrupt process which can be executed at a predetermined time.

The interrupt program module according to the invention is implemented by a computer when the computer receives an interrupt request to supply information that will indicate the processing state of the computer. The computer, which sequentially consecutively performs a plurality of predetermined processes, implements the interrupt program module when the computer receives an interrupt request to supply monitoring information indicating the processing state of the computer to a monitoring unit connected to the computer. Further, the interrupt program module allows the computer to decide whether or not to execute an interrupt process, in which the monitoring information is supplied to the monitoring unit based on information received when the computer receives the interrupt request. Moreover, the computer receives the interrupt request at a previously set time during the execution of processes. The interrupt program module further includes the supplying of the monitoring information, wherein the monitoring information relates to the computer process that occurred immediately before deciding whether or not to execute the interrupt process. The interrupt program module further includes canceling the interrupt process after the monitoring information is supplied to the monitoring unit.

DETAILED DESCRIPTION OF THE PREFERRED EMBODIMENTS

The invention is now described with reference to the first through the third preferred embodiments as shown in FIGS. 1–4.

Figure 1:
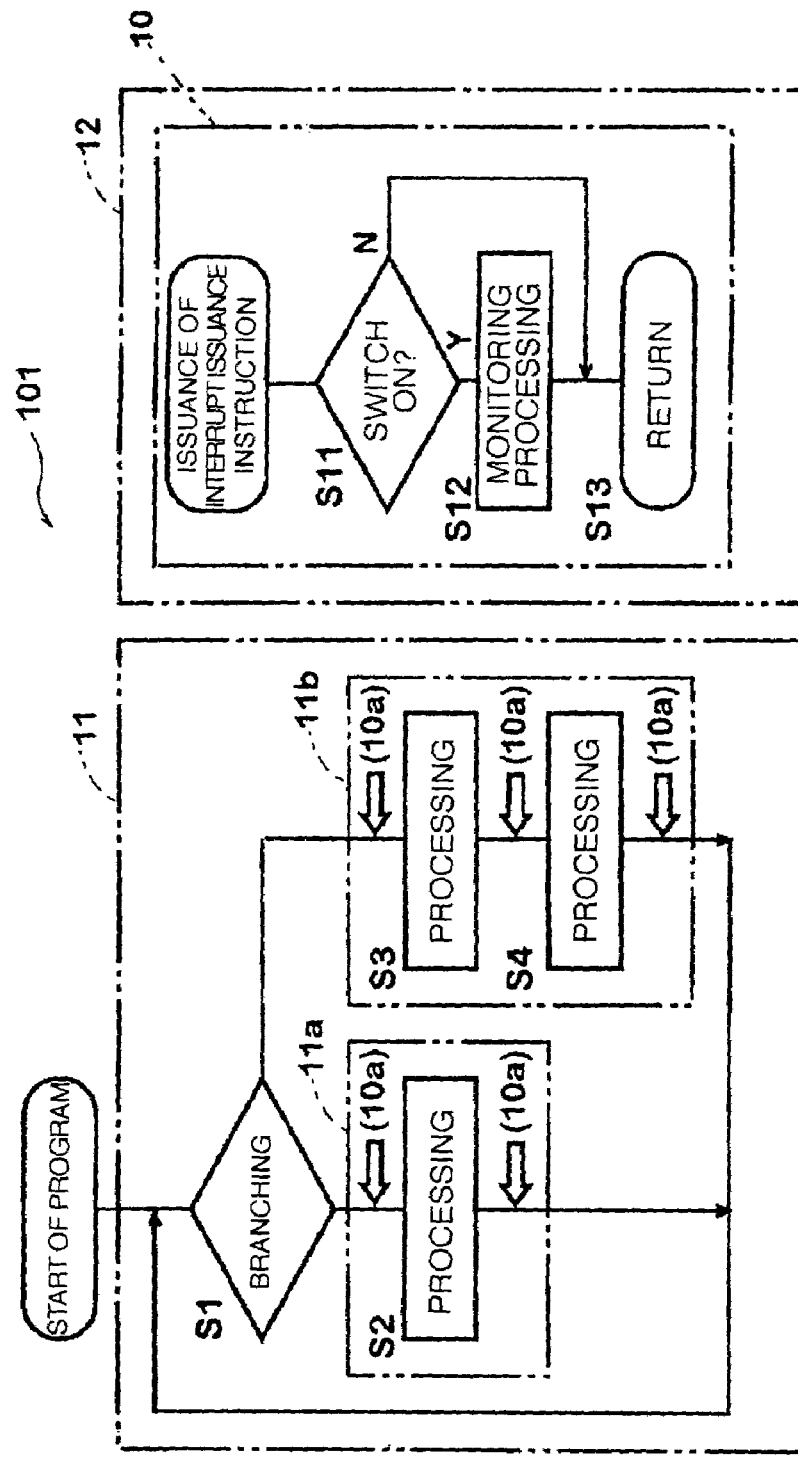
FIG. 1 is a flowchart for explaining the first preferred embodiment.

FIG. 1 shows a flowchart for explaining a program 101 according to the first preferred embodiment of the invention, wherein an interrupt program module 10 of the invention is built in the program 101.

Figure 2:
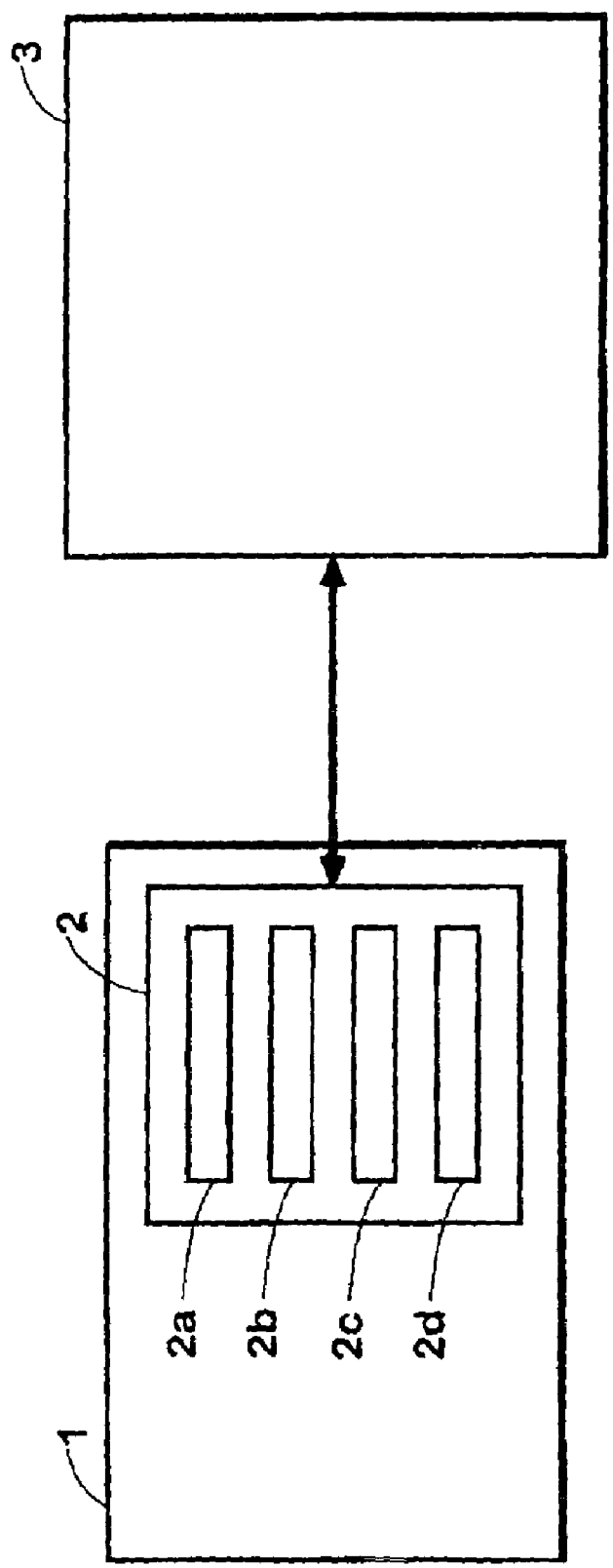
FIG. 2 is a block diagram for explaining the first preferred embodiment.

The program 101 is built in an MCU (Micro Controller Unit) 2 mounted on a wiring board 1 as shown in FIG. 2 and it is used in an environment having no OS (Operating System). The wiring board 1 on which the MCU 2 is mounted serves as a so-called target board, e.g., for performing an evaluation test of the MCU 2. The MCU 2 is provided with a storage section 2a for storing the program 101, a controller section 2b for executing the program 101, a timer section 2c, and an auxiliary timer section 2d, such elements are later described in further detail.

The MCU 2 is connected to an external analyzing unit 3 for monitoring the processing state of the program 101 so as to mutually communicate therebetween by way of a communication mechanism such as a UART, not shown, in order to decide whether or not the program 101 built in the MCU 2 is operating normally.

A signal indicating "ON" or "OFF", showing whether or not the monitoring can be implemented, is sent from the external analyzing unit 3 to a given input port of the MCU 2. A general port of the MCU 2 can be used as the a given input port, wherein this port is treated hereinafter and referred to as a switch in the first preferred embodiment.

A main loop program 11 (hereinafter referred to simply as main loop 11) by which a processing loop 11a or 11b is selectively implemented via a branch decision step S1 and an interrupt processing program 12 for an interrupt process which is executed during the main loop 11, if need be, are respectively built in the program 101 as shown in FIG. 1. Both the main loop 11 and the interrupt processing program 12 are stored in a given area of the storage section 2a of the MCU 2.

In the main loop 11, a processing step S2 is implemented when the processing loop 11a is selected, while processing steps S3 and S4 are sequentially implemented when the other processing loop 11b is selected. The program returns to the branch decision step S1 by a given loop instruction upon completion of all the steps in the processing loops 11a and 11b. The MCU 2 executes a main task to be executed by itself when the main loop 11 is implemented.

At least one program module for executing the interrupt process relative to the main loop 11 is built in the interrupt processing program 12. The program module for executing the interrupt process is executed at high priority, as compared to processes which occurs during the implementation of the main loop 11.

The interrupt program module 10, which performs the monitoring function of the invention, is illustrated as the interrupt processing module according to the first preferred embodiment, as shown in FIG. 1. An interrupt program module for executing a given task inside the MCU 2 can be appropriately added to the interrupt program module 10 in the same manner as the conventional interrupt process. Other modules, except for the interrupt program module 10 having the monitoring function, can be implemented during the implementation of the main loop 11, if need be, for example, in response to the instruction from the controller section 2b of the MCU 2.

The interrupt program module 10 of the invention interrupts the main loop 11 every time the MCU 2 receives an interrupt request instruction 10a from the external analyzing unit 3. The time for issuing the interrupt request instruction 10a is previously set by the external analyzing unit 3. According to the first preferred embodiment, the interrupt request instruction 10a is issued before or after all of the processing steps in the processing loop 11a and 11b are implemented.

The interrupt program module 10 comprises a decision step S11 for deciding a state of the switch of the MCU 2 when it is interrupted, a monitoring process step S12 for performing a monitoring function so as to cause the external analyzing unit 3 to monitor a processing step of the main loop 11 of the MCU 2 when the switch is decided to be "ON", and a returning step S13 for canceling the interrupt process of the interrupt program module 10 and returning to the main loop 11 when the switch is decided to be "OFF" in the decision step S11 or upon completion of the monitoring in the monitoring process step S12.

When the monitoring process step S12 is executed in the interrupt program module 10, monitoring information indicating the state of the processing of the MCU 2 immediately before receiving the interrupt request instruction 10a is supplied from the MCU 2 to the external analyzing unit 3.

In the first preferred embodiment, when the processing loop 11a is selected in the branch decision step S1 of the main loop 11 as shown in FIG. 1, the interrupt request instruction 10a is issued before the processing step S2 is implemented. When the interrupt request instruction 10a is issued, the state of the switch is decided in the MCU 2 based on the interrupt program module 10 (step S11).

When the state of the switch is decided to be "OFF" based on this decision, the interrupt process to start the processing step S2 of the main loop 11 (step S13) is cancelled without executing the monitoring process by the controller section 2b.

If the state of switch is decided to be "ON" in the decision step S11, the monitoring process is executed by the controller section 2b (step S12). Upon completion of the supply of the monitoring information from the MCU 2 to the external analyzing unit 3 in the step S12, the program goes to a step S13 where the program returns to the main loop 11.

When the program returns from the interrupt program module 10 to the main loop 11, the processing step S2 is implemented. The interrupt request instruction 10a is reissued again before returning to the branch decision step S1 upon completion of the processing step S2. When the interrupt request instruction 10a is reissued, the interrupt program module 10 is interrupted and the steps S10 to S13 are appropriately implemented in the same manner as the case set forth above, and then the program returns to the branch decision step S1.

If the other processing loop 11b is selected by the branch decision in the step S1, the program returns to the branch decision step S1 after the interrupt program module 10 is interrupted in the same manner as one processing loop 11a before or after the processing steps S3 and S4 are implemented.

According to the interrupt program module 10 of the first preferred embodiment of the invention, since the monitoring process is executed as an interrupt process relative to the main loop 11, the monitoring process can be executed without returning to the branch decision step S1 in the processing loops 11a and 11b of the main loop 11. As a result, the state between the respective processing steps of the processing loops can be monitored.

Although the first preferred embodiment is exemplified in the case where the interrupt request instruction 10a is issued before or after all the steps S2 to S4 of the main loop 11 are implemented, it is possible to set the time when the interrupt request instruction 10a is issued before or after a desired processing step is implemented.

Another interrupt module can be added to the interrupt processing program 12 in addition to the interrupt program module having the monitoring function set forth above. At this time, the correct monitoring information relating to the result of processing can be obtained by prohibiting the other module interrupt process during the implementation of the desired processing step to monitor the result of the execution. Such a prohibition of the interrupt process can be executed while controlled by the external analyzing unit 3 using a monitoring function of the interrupt program module 10 which is interrupted when the interrupt request instruction 10a is issued, for example, immediately before a desired processing step is implemented.

Figure 3:
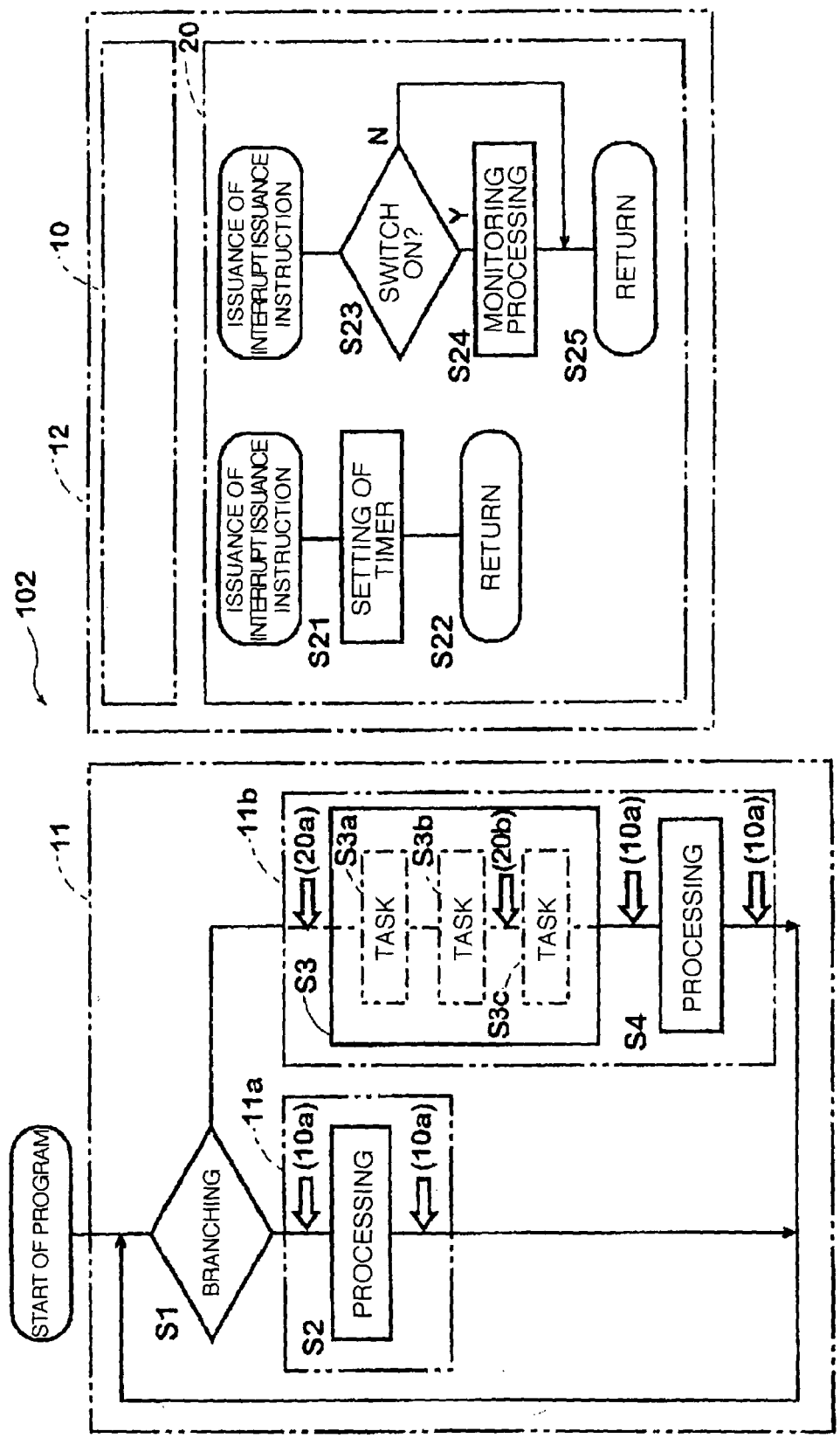
FIG. 3 is a flowchart for explaining the second preferred embodiment.

FIG. 3 is a flowchart showing a program 102 according to the second preferred embodiment of the invention, wherein a timer interrupt program module 20 is built in the program 102.

The timer interrupt program module 20 is capable of automatically executing a monitoring process by setting a timer, (described later), which is included in an interrupt processing program 12 of the program 102 shown in FIG. 3 in addition to the interrupt program module 10 explained in the first preferred embodiment.

The timer section 2c is provided in an MCU 2, and a desired time can be set at the timer section 2c, for example, by the external analyzing unit 3 as shown in FIG. 2. A set desired time is counted at the timer section 2c, and upon completion of the counting, namely, if the time is up, that the counting is completed is notified to the controller section 2b as an interrupt request instruction 20b, (described later).

A timer interrupt process 20A to set a desired time for executing the monitoring process at the timer section 2c of the MCU 2 from the external analyzing unit 3, and a timer interrupt process 20B having a monitoring function which is the same as the interrupt program module 10 in the first preferred embodiment and is interrupted at a set desired time, are included in the timer interrupt program module 20, respectively. The timer interrupt process 20A is implemented when an interrupt request instruction 20a is issued from the external analyzing unit 3 to the MCU 2 during the implementation of the main loop 11, and the timer interrupt process 20B is implemented at the time of issuance of the interrupt request instruction 20b which is issued by the timer section 2c of the MCU 2 at the subsequent time out.

An operation of the MCU 2 associated with the timer interrupt program module 20 is now described with reference to FIG. 3. A processing step S3 in a processing loop 11b of the main loop 11 comprises task steps S3a, S3b and S3c.

For example, if the processing loop 11b is selected at a branch decision step S1 of the main loop 11, the interrupt request instruction 20a is issued from the external analyzing unit 3 before the processing step S3 is implemented. When the interrupt request instruction 20a is issued, the timer interrupt program module 20 is implemented as set forth above, and the timer interrupt processing 20A is executed.

In the timer interrupt process 20A, a desired time to execute the monitoring process is set by the external analyzing unit 3 (step S21). A given time during which the monitoring process is executed is set at the timer section 2c between the task steps S3b and S3c in the processing step S3. Upon completion of the setting of the given time, the interrupt process is cancelled so as to start the processing step S3 in the processing loop 11b (step S22).

Upon completion of the cancellation of the interrupt process, the task step S3a of the processing step S3 is implemented in the main loop 11. Upon completion of the task step S3b followed by the task step S3a, a given time set at the timer section 2c in the step 21 is up, and the interrupt request instruction 20b is issued from the timer section 2c to the controller section 2b.

The timer interrupt process 20B of the timer interrupt program module 20 is executed when the interrupt request instruction 20b is issued. In the timer interrupt process 20B, a state of the switch of the external analyzing unit 3 showing the monitoring function, is decided (step S23). Subsequently, the monitoring process appropriately and in accordance with a state of the switch in the same manner as the steps S11 to S13 in the interrupt program module 10, as set forth in the first preferred embodiment, then the program returns to the main loop 11.

After returning from the timer interrupt process 20B, the task step S3c of the processing step S3 is implemented in the main loop 11. The interrupt request instruction 10a is issued from the external analyzing unit 3 before the implementation of a processing step S4 followed by processing step S3 upon completion of the task step S3c so that the interrupt program module 10 is executed in the same manner as the first preferred embodiment. Subsequently, if the interrupt process is cancelled by the interrupt program module 10, the processing step S4 is implemented, then the interrupt program module 10 is executed again by the interrupt request instruction 10a before the program returns to the branch decision step S1 upon completion of the processing step S4.

According to the timer interrupt program module 20 of the second preferred embodiment of the invention, there is an effect that a desired time when the timer interrupt process 20B for performing monitoring function is interrupted can be set at the timer section 2c inside the MCU 2 in addition to substantially the same effect as the first preferred embodiment. As a result, the timer interrupt process 20B can be interrupted at the correct time relative to the desired time during the implementation of the main loop 11. Further, when the timer section 2c is appropriately controlled, the time during which a monitoring is performed can be relatively easily changed.

Figure 4:
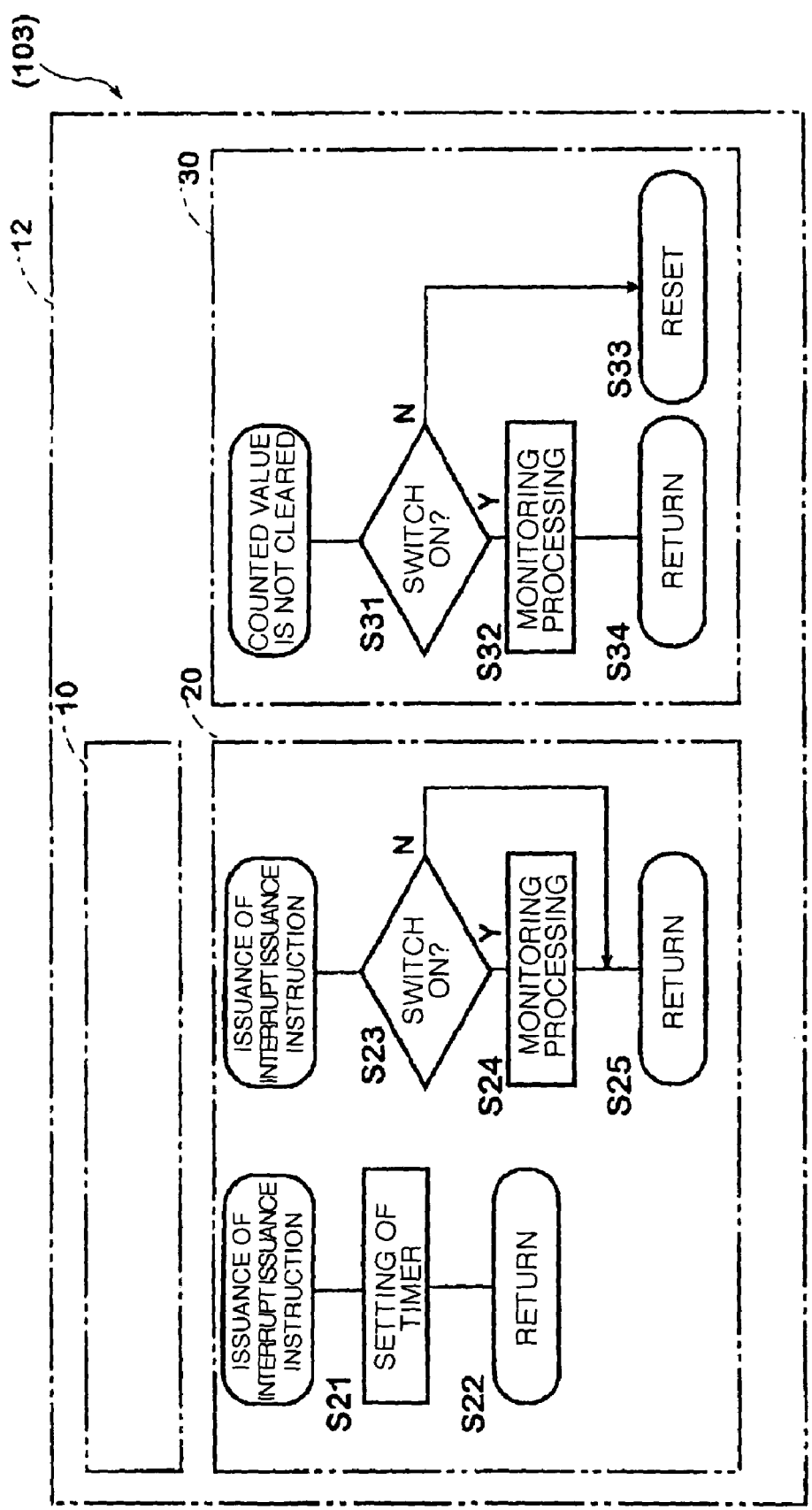
FIG. 4 is a flowchart for explaining the third preferred embodiment.

FIG. 4 is a flowchart for explaining a program 103 according to the third preferred embodiment of the invention, wherein an interrupt program module 30 is built in the program 103. In FIG. 4, the flowchart of the main loop 11 shown in the first and second preferred embodiments are omitted in the program 103, for brevity of explaining the figure, the interrupt processing program 12 is illustrated.

The interrupt program modules 10 and 20 which are explained with reference to the first and second preferred embodiments, and the interrupt program module 30 utilizing a watchdog timer function, (described later), are built in the interrupt processing program 12, as shown in FIG. 4.

An MCU 2 is provided with an auxiliary timer section 2d as shown in FIG. 2. A well known watchdog timer function for monitoring whether or not the program 103 operates normally is provided to the auxiliary timer section 2d. The auxiliary timer section 2d provided with the watchdog timer function counts a given time which is previously set at the auxiliary timer section 2d as a basic operation, and gives an instruction for resetting the execution of the program 103 to a controller section 2b upon completion of the counting operation.

A signal for clearing the counted value is supplied from the controller section 2b to the auxiliary timer section 2d at the time before arriving at the given time, namely, before the auxiliary timer section 2d time is up relative to the basic operation. The auxiliary timer section 2d starts a new counting operation without executing the resetting instruction when time is up, upon reception of the clear signal at the auxiliary timer section 2d while the counted value is returned to an initial value.

There is a circumstance where the clear signal is not supplied from the controller section 2b to the auxiliary timer section 2d within the given period of time, such a circumstance will occur if there is any abnormality such as the generation of an infinite loop during the execution of the program 103. Since the counted value is not returned to the initial value at the auxiliary timer section 2d unless the clear signal is supplied to the auxiliary timer section 2d, if a given time lapses while the clear signal is not given to the auxiliary timer section 2d, an instruction for resetting the execution of the program 103 is issued from the auxiliary timer section 2d to the controller section 2b.

From this, it is considered that the clear signal is supplied appropriately from the controller section 2b to the auxiliary timer section 2d during a period where the counted value is periodically cleared at the auxiliary timer section 2d. Accordingly, it is possible to monitor whether or not the program 103 for operating the controller section 2b operates normally by deciding whether or not the counted value is cleared.

The interrupt program module 30 in the third preferred embodiment utilizes the watchdog timer function at the auxiliary timer section 2d, and hence the monitoring process can be compulsorily executed, if need be, even if an abnormality occurs during the implementation of the main loop 11.

The interrupt program module 30 comprises a step S31 for deciding a state of the switch relating to the monitoring function when the counted value at the auxiliary timer section 2d is not cleared, a step S32 for resetting the execution of the program 103 when the switch is "OFF", a step S33 for executing the monitoring process when the switch is "ON", and a step S34 for canceling the interrupt process upon completion of the monitoring process.

According to the third preferred embodiment, during the implementation of the main loop 11, for example, if an abnormality occurs during the progress of the program 103 before the timer interrupt process 20B of the timer interrupt program module 20 is executed, such that the counted value is not cleared at the auxiliary timer section 2d, as explained in the second preferred embodiment, the interrupt program module 30 is interrupted. In the MCU 2, the steps S31 to S34 are implemented appropriately based on the interrupt program module 30.

According to the interrupt program module 30 in the third preferred embodiment, even if the issuance of the interrupt request for the monitoring function is prevented because of the occurrence of an abnormality in the program 103, there is an effect that the program can be compulsorily moved to the monitoring process using the monitoring function of the watchdog timer at the auxiliary timer section 2d in addition to the arrangement of the first and second preferred embodiments. As a result, monitoring information is supplied to the external analyzing unit 3, and hence the abnormality in the program 103 can be analyzed.

Although the interrupt program module having the monitoring function is explained in the first to third preferred embodiments, the invention can provide a recording medium in which the interrupt program module for monitoring is recorded, and a computer capable of executing the interrupt process for monitoring based on the interrupt program module.

According to the invention, it is possible to provide an interrupt program module in the program of the computer, which is capable of enabling the computer to execute the interrupt process having a monitoring function without returning to the branch decision step during the execution of the processing loops. As a result, the states of processing steps before and after a desired processing step of the processing loops can be monitored so that the program can be investigated in detail.

Further, according to the invention, it is possible to provide the recording medium in which the interrupt program module is stored and the computer is capable of executing the interrupt process for monitoring based on the interrupt program module.

The present invention may provide a method of interrupting a plurality of programs by a computer that is connected to a monitoring unit. The method includes deciding whether or not to execute an interrupt process which will result in monitoring when receiving an interrupt request at a given time, during the execution of a plurality of programs, and causing the monitoring unit to indicate the state of processing of the computer when it is appropriate to execute the monitoring

What is claimed is:

1. A computer implemented method to be implemented by a computer, which sequentially consecutively performs a plurality of predetermined processes, when the computer receives an interrupt request, for supplying monitoring information indicating the processing state of the computer to a monitoring unit connected to the computer, said computer implemented method comprising:
   deciding whether or not to execute an interrupt process, in which the monitoring information is supplied to the monitoring unit based on information received when the computer receives the interrupt request;
   supplying the monitoring information to the monitoring unit, wherein the monitoring information relates to the computer process that occurred immediately before said deciding of whether or not to execute the interrupt process; and
   cancelling the interrupt process after the monitoring information is sent to the monitoring unit.

2. The computer implemented method according to claim 1, wherein said cancelling of the interrupt process is implemented by the computer when it is decided, in said deciding of whether or not to execute the interrupt process, to not execute the interrupt process.

3. The computer implemented method according to claim 1, further comprising setting a desired time when the interrupt request is issued to the computer.

4. The computer implemented method according to claim 3, further comprising:
   deciding whether no interrupt request was received by the computer because of an abnormality;
   compulsorily deciding whether or not to execute the interrupt process when it is decided, in said deciding of whether no interrupt request was received by the computer because of an abnormality, that no interrupt request was received because of an abnormality; and
   executing a reset process to reset the computer when non-execution of the interrupt process is decided in said compulsorily deciding whether or not to execute the interrupt process.

5. The computer implemented method according to claim 1, wherein, when implementing said determining whether or not to execute an interrupt process, the information received when the computer receives the interrupt request indicates whether or not the interrupt process is executed.

6. A recording medium storing an interrupt program module operable to be implemented by a computer, which sequentially consecutively performs a plurality of predetermined processes, when the computer receives an interrupt request, for supplying information indicating the processing state of the computer to a monitoring unit connected to the computer, said interrupt program module stored in said recording medium being operable to perform:
   deciding whether or not to execute an interrupt process, in which the monitoring information is supplied to the monitoring unit based on information received when the computer receives the interrupt request;
   supplying the monitoring information to the monitoring unit, wherein the monitoring information relates to the computer process that occurred immediately before said deciding of whether or not to execute the interrupt process; and
   cancelling the interrupt process after the monitoring information is sent to the monitoring unit.

7. The recording medium according to claim 6, wherein the interrupt program module stored on the recording medium is operable to implement said cancelling of the interrupt process when it is decided in said deciding of whether or not to execute the interrupt process, to not execute the interrupt process.

8. A computer operable to sequentially consecutively perform a plurality of predetermined processes, operable to receive an interrupt request, and operable to supply monitoring information indicating the processing state of said computer to a monitoring unit connected to said computer, said computer comprising:
- a deciding part operable to decide whether or not to execute an interrupt process, in which the monitoring information is supplied to the monitoring unit based on information received when the computer receives the interrupt request;
- an information supply part operable to supply the monitoring information to the monitoring unit, wherein the monitoring information relates to the computer process that occurred immediately before said deciding part decides whether or not to execute the interrupt process; and
- a cancelling part operable to cancel the interrupt process after the monitoring information is sent to the monitoring unit.

9. The computer according to claim 8, wherein said cancelling part is operable to cancel the interrupt request when said deciding part decides to not execute the interrupt process.

10. The computer according to claim 8, further comprising a timer setting part operable to set a desired time for the interrupt request to be issued.

11. The computer according to claim 10, wherein said computer further comprises:
- a no interrupt request deciding part operable to decide whether no interrupt request was received by the computer because of an abnormality;
- a compulsorily deciding part operable to compulsorily decide whether or not to execute the interrupt process when said no interrupt request deciding part decided no interrupt request was received by the computer because of an abnormality; and
- a resetting processing part operable to execute a reset process when non-execution of the interrupt process is decided in said compulsorily deciding part.

* * * * *